United States Patent
Branco (10) Patent No.: US 10,177,919 B2
(45) Date of Patent: Jan. 8, 2019

(54) FUZZY HASHES FOR CODE SIGNING

(71) Applicant: Intel Corporation, Santa Clara, CA (US)

(72) Inventor: Rodrigo R. Branco, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 15/277,663

(22) Filed: Sep. 27, 2016

(65) Prior Publication Data

US 2018/0091310 A1     Mar. 29, 2018

(51) Int. Cl.
*H04L 29/06* (2006.01)
*H04L 9/32* (2006.01)
*H04L 9/06* (2006.01)

(52) U.S. Cl.
CPC .......... *H04L 9/3247* (2013.01); *H04L 9/0643* (2013.01)

(58) Field of Classification Search
CPC .................................................. H04L 9/3247
See application file for complete search history.

(56) References Cited

U.S. PATENT DOCUMENTS

| | | | |
|---|---|---|---|
| 9,594,906 B1* | 3/2017 | Langton | G06F 21/566 |
| 2016/0323243 A1* | 11/2016 | LeVasseur | G06N 99/005 |
| 2017/0177869 A1* | 6/2017 | Langton | G06F 21/566 |
| 2018/0052997 A1* | 2/2018 | Wray | G06F 21/566 |

OTHER PUBLICATIONS

Kornblum, Jesse, "Identifying Almost Identical Files Using Context Triggered Piecewise Hashing", Digital Forensic Research Conference, (Aug. 2006), 8 pgs.

* cited by examiner

*Primary Examiner* — Mahfuzur Rahman
(74) *Attorney, Agent, or Firm* — Schwegman Lundberg & Woessner, P.A.

(57) ABSTRACT

Various systems and methods for providing a mechanism for using fuzzy hashes for code signing are described herein. A build system for using fuzzy hashes for code signing including a file system to access a binary file; a signing engine to: generate a one-way hash of the binary; calculate a fuzzy hash of the binary; obtain a fuzzy hash of a second binary; and conditionally sign the one-way hash of the binary when the fuzzy hash of the binary differs less than a threshold amount from the fuzzy hash of the second binary.

19 Claims, 3 Drawing Sheets

FUZZY HASHES FOR CODE SIGNING

TECHNICAL FIELD

Embodiments described herein generally relate to data encryption and in particular, to fuzzy hashes for code signing.

BACKGROUND

In many modern systems, code signing is used as a security mechanism to ensure that the code is from an authentic source. Code signing is a mechanism to digitally sign code binaries to confirm the source of the software and guarantee that the code has not be altered. In large scale software development environments, automatic code signing mechanisms are used. Some automatic code signing mechanisms may allow for abuse, for instance, the signing malicious code by a bad actor.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Fuzzy hashes, such as context triggered piecewise hashes (CTPH), may be used to identify code similarity. Applications for fuzzy hashes include piracy identification (e.g., illegal code reuse) or malware analysis (e.g., family grouping). Such fuzzy hashes have not been used in the code signing process.

Modern operating systems, hardware, and application platforms often require that binary code is signed before allowing such code to execute. Code, such as drivers or firmware, is used in critical systems and if compromised, may expose a system to disastrous effects.

To sign code, software developers use one of several authentication and authorization mechanisms. For instance, a certificate authority may be used to issue a public/private key pair. The code may be signed with a private key and authenticated using a published public key. In a large institution, a private certificate authority may be used to authenticate the code signature.

When a developer completes a version or revision of code, the developer may sign the code. The code signing may be built into an automated process, such that when the developer submits the code for a build, one or more executables are automatically signed. Because signing is automatic and built into a process that is largely automated, auditing the code signing process is difficult.

The signing service that is exposed to authorized users is used automatically by build systems. Developers submit their applications for building and the system automatically contacts the signing service, submits the binaries and receives the signed files. The problem is due to this process, any local admin on those machines is able to submit a malicious file for signing, without changing the code (which would generate logs).

What is needed is a mechanism to spot differences in binary code being automatically signed, in order to detect malicious usage. In normal development processes code changes happen in an incremental way. As such, production-level signed binaries should not be vastly different from the development signed binaries. In most cases, production code only includes bug fixes of post-validation development code, which results in relatively minor changes. In addition, during the development process, changes are gradually submitted to the building process, meaning that even major changes may be inserted in pieces. What is needed is an efficient mechanism to provide additional security and authentication of code bases so that a malicious user is not able to easily insert malicious code into production.

Systems and methods described herein provide a mechanism for using fuzzy hashes for code signing. A fuzzy hash may be produced for each binary and used to determine the difference between two code binaries. Based on the comparison of each file's fuzzy hash, if the binaries are more than a threshold amount different from each other, then a recovery process may be initiated. Such a process is minimally invasive to the conventional build process, helps to avoid human error, helps to detect malicious activity, and provides additional security.

Figure 1:
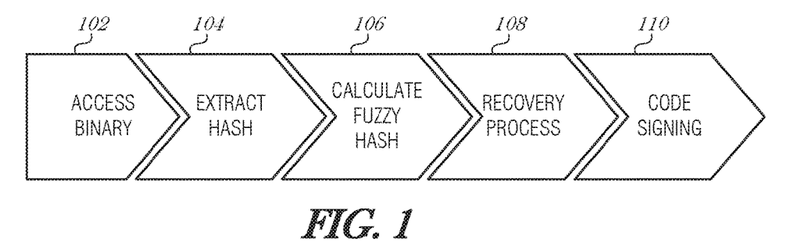
FIG. 1 is a schematic drawing illustrating control and data flow, according to an embodiment.

FIG. 1 is a schematic drawing illustrating control and data flow 100, according to an embodiment. A binary is provided for signing (phase 102). A hash is extracted from the binary (phase 104). Up to this point, the control and data flow 100 is similar to conventional signing processes. In addition to a hash to be used for code signing (phase 104), an additional fuzzy hash is calculated (phase 106). The fuzzy hash is calculated by comparing the current binary to a previous binary. The previous binary may be a code revision immediately preceding the current binary (e.g., the previous release) or may be another binary from a code base, such as the last major code release.

The fuzzy hash indicates that more than a threshold amount of change occurred between the current binary and the comparison binary, one or more recovery processes may be initiated (phase 108). For instance, if a fuzzy hash indicates a moderate change from a previous binary, then an alert may be logged or presented to a user. If the fuzzy hash indicates a more severe change from the previous binary, then the signing phase (110) may be avoided or aborted.

Using the fuzzy hash comparison with previous versions it is possible to define the acceptable threshold based on a per-product understanding of historical changes (e.g., how much it changes for each interaction). Also, the decision may be made to only alert once a soft threshold is met, but to block signing or building after a hard threshold. Alternatively, policies may be used to control the signing process such that it never blocks, only alerts, depending on other business decisions. Note that for the first generation of a project, a manual decision to build and sign is made, because there are no previous versions of the binary to compare.

Fuzzy hashes do not serve the purpose of the signature itself (thus, the usual hashing mechanism for the signature still takes place), but it also does not interfere with it. In some implementations, the comparison with the previous version is a hash comparison (e.g., a fuzzy hash obtained for two versions are compared), not a new binary comparison so the biggest added slowdown is the computation of the fuzzy hash. Additionally, in some embodiments, a history of the generated fuzzy hashes may be kept. In this scenario, even reverting entire patches or changes would not trigger a false alarm. The disclosed implementation solves a currently hard problem on providing automated signing decisions for high volume projects, while providing minimum protection mechanisms to what is signed, thus diminishing the exposure/risk and increasing attack difficulty. It is also inexpensive to implement, requiring no major design changes (even if the build system is responsible for extracting the hashes of what is signed to avoid binaries transmitted through the network).

Figure 2:
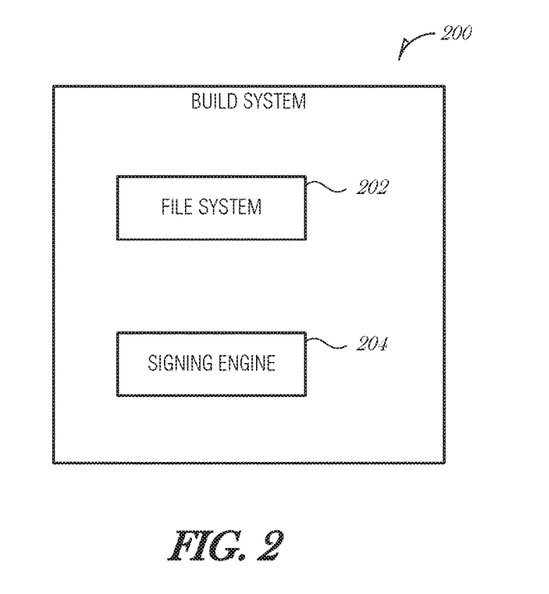
FIG. 2 is a block diagram illustrating a build system that uses fuzzy hashes for code signing, according to an embodiment.

FIG. 2 is a block diagram illustrating a build system 200 that uses fuzzy hashes for code signing, according to an embodiment. The build system 200 includes a file system 202 and a signing engine 204. The file system 202 may be configured to access a binary file. The binary file may be on a file server, in a local directory, or in other storage. In an embodiment, the binary file comprises an executable file. The binary file may be an object file, a library file, an image file, or other file used in a software development build.

The signing engine 204 may be configured to generate a one-way hash of the binary, calculate a fuzzy hash of the binary obtain a fuzzy hash of a second binary, and conditionally sign the one-way hash of the binary when the fuzzy hash of the binary differs less than a threshold amount from the fuzzy hash of the second binary.

In an embodiment, to calculate the fuzzy hash of the binary, the signing engine 204 is to use a context triggered piecewise hash methodology. In a further embodiment, to obtain the fuzzy hash of the second binary, the signing engine 204 is to use the context triggered piecewise hash methodology. In yet a further embodiment, the second binary is a previous version of the binary file. For example, during development, the second binary may represent a previously released or developed version of the binary file.

In an embodiment, to sign the one-way hash of the binary, the signing engine 204 is to use a private key infrastructure digital signature to sign the one-way hash.

In an embodiment, the threshold amount is user configurable. In an embodiment, the threshold amount is based on a running average. For instance, when code is compiled over a number of times, ten compilations for example, then fuzzy hashes for each compilation may be computed and compared to the previous fuzzy hash. The differences may be logged and averaged over a moving window often compilations (or any configurable number). When a later compilation is performed and its fuzzy hash is computed and compared to the previous version's fuzzy hash, if the difference is more than the running average of the last ten compilations, then a recovery process may be initiated. In such a system, the first N compilations (e.g., ten compilations) may be used to establish a baseline running average of the moving window. The recovery process may be suspended during this training period.

In an embodiment, the signing engine 204 is to initiate a recovery process when the fuzzy hash of the binary differs more than the threshold amount from the fuzzy hash of the second binary. In a further embodiment, the recovery process comprises presenting an alert to a user of the build system. In another embodiment, the recovery process comprises aborting a signing process to avoid signing the binary file.

Figure 3:
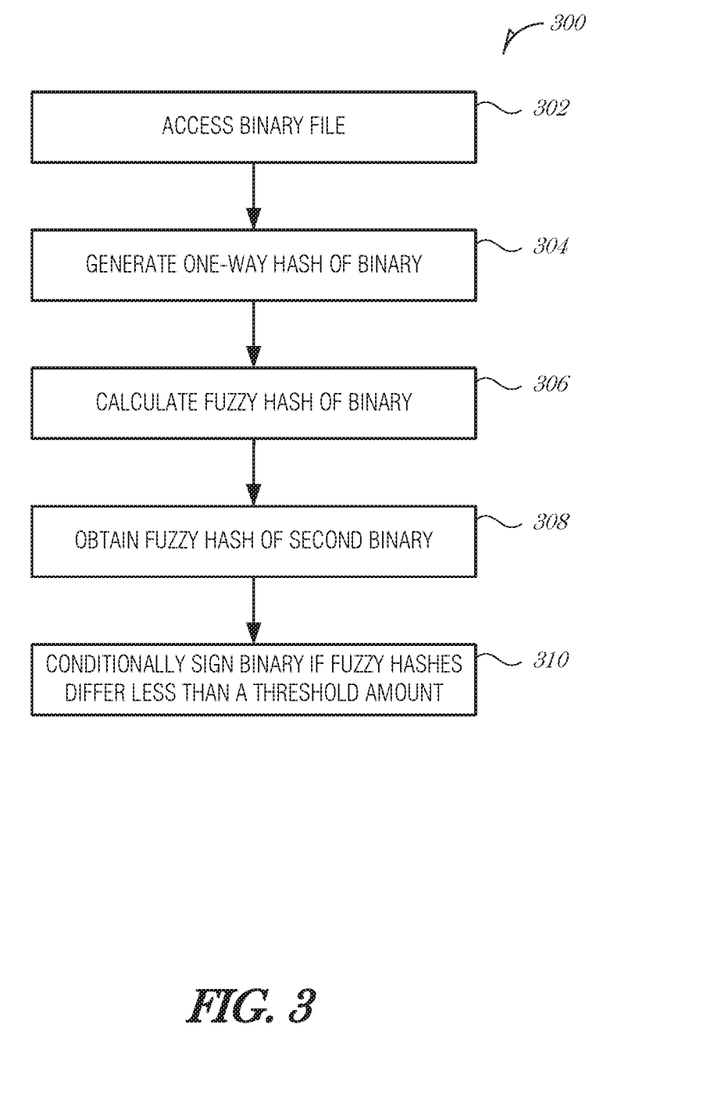
FIG. 3 is a flowchart illustrating a method for using fuzzy hashes for code signing, according to an embodiment.

FIG. 3 is a flowchart illustrating a method 300 for using fuzzy hashes for code signing, according to an embodiment. At 302, a binary file is accessed in a build system. The build system may be a single computer, such as a desktop that a developer is using, or multiple computers, such as a corporate-wide build system. In an embodiment, the binary file comprises an executable file.

At 304, a one-way hash of the binary is generated in the build system.

At 306, a fuzzy hash of the binary is calculated in the build system. In an embodiment, calculating the fuzzy hash of the binary comprises using a context triggered piecewise hash methodology.

At 308, a fuzzy hash of a second binary is obtained in the build system. In an embodiment, obtaining the fuzzy hash of the second binary comprises using the context triggered piecewise hash methodology. In a further embodiment, the second binary is a previous version of the binary file.

At 310, when the fuzzy hash of the binary differs less than a threshold amount from the fuzzy hash of the second binary, the one-way hash of the binary is conditionally signed. In an embodiment, signing the one-way hash of the binary comprises using a private key infrastructure digital signature to sign the one-way hash.

In an embodiment, the threshold amount is user configurable. In another embodiment, the threshold amount is based on a running average. The running average may be computed over a moving window, as described above.

In an embodiment, the method 300 includes initiating a recovery process when the fuzzy hash of the binary differs more than the threshold amount from the fuzzy hash of the second binary. In a further embodiment, the recovery process comprises presenting an alert to a user of the build system. In another embodiment, the recovery process comprises aborting a signing process to avoid signing the binary file.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 4:
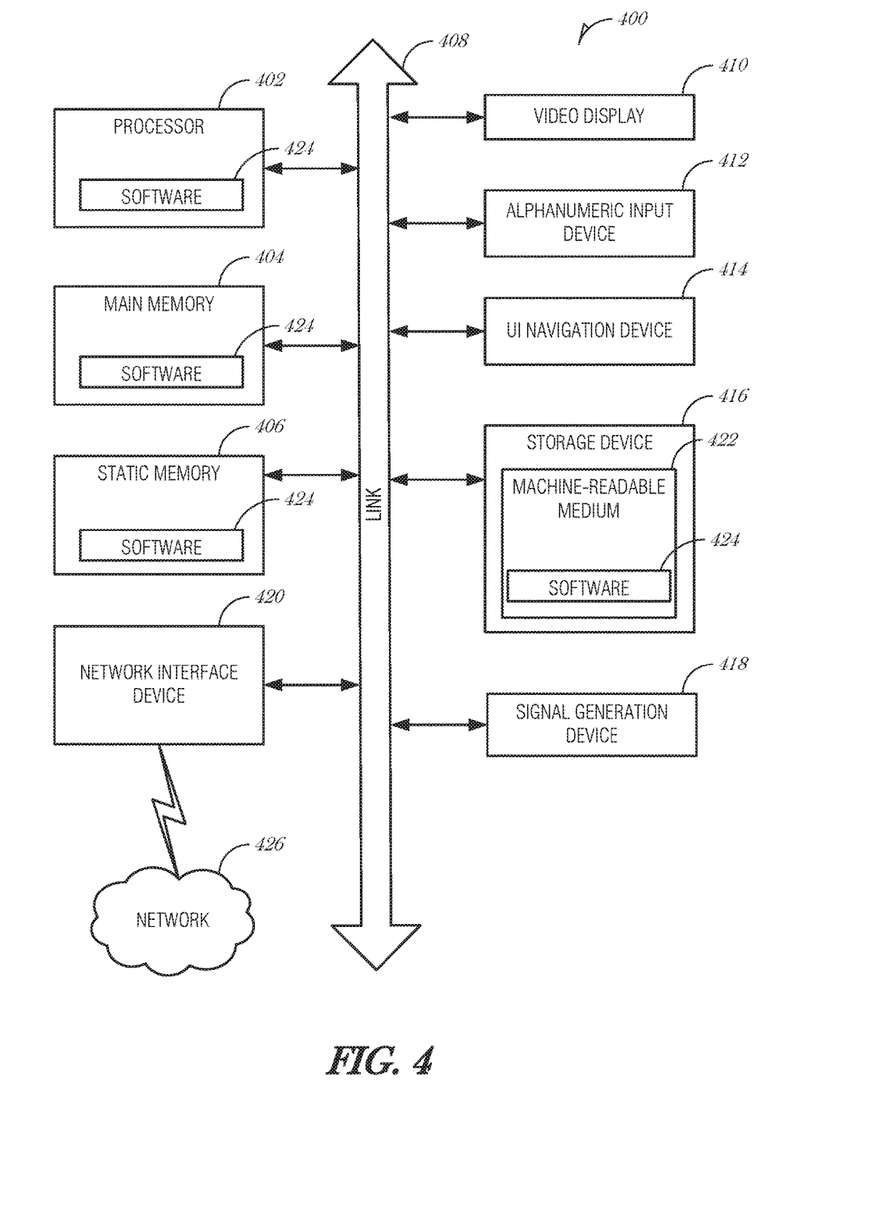
FIG. 4 is a block diagram illustrating an example machine upon which any one or more of the techniques (e.g., methodologies) discussed herein may perform, according to an example embodiment.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a build system for using fuzzy hashes for code signing, the system comprising: a file system to access a binary file; and a signing engine to: generate a one-way hash of the binary; calculate a fuzzy hash of the binary; obtain a fuzzy hash of a second binary; and conditionally sign the one-way hash of the binary when the fuzzy hash of the binary differs less than a threshold amount from the fuzzy hash of the second binary.

In Example 2, the subject matter of Example 1 optionally includes wherein the binary file comprises an executable file.

In Example 3, the subject matter of any one or more of Examples 1-2 optionally include wherein to calculate the fuzzy hash of the binary, the signing engine is to use a context triggered piecewise hash methodology.

In Example 4, the subject matter of Example 3 optionally includes wherein to obtain the fuzzy hash of the second binary, the signing engine is to use the context triggered piecewise hash methodology.

In Example 5, the subject matter of Example 4 optionally includes wherein the second binary is a previous version of the binary file.

In Example 6, the subject matter of any one or more of Examples 1-5 optionally include wherein to sign the one-way hash of the binary, the signing engine is to use a private key infrastructure digital signature to sign the one-way hash.

In Example 7, the subject matter of any one or more of Examples 1-6 optionally include wherein the threshold amount is user configurable.

In Example 8, the subject matter of any one or more of Examples 1-7 optionally include wherein the threshold amount is based on a running average.

In Example 9, the subject matter of any one or more of Examples 1-8 optionally include wherein the signing engine is to initiate a recovery process when the fuzzy hash of the binary differs more than the threshold amount from the fuzzy hash of the second binary.

In Example 10, the subject matter of Example 9 optionally includes wherein the recovery process comprises presenting an alert to a user of the build system.

In Example 11, the subject matter of any one or more of Examples 9-10 optionally include wherein the recovery process comprises aborting a signing process to avoid signing the binary file.

Example 12 is a method of using fuzzy hashes for code signing, the method comprising: accessing, in a build system, a binary file; generating, in the build system, a one-way hash of the binary; calculating, in the build system, a fuzzy hash of the binary; obtaining, in the build system, a fuzzy hash of a second binary; and conditionally signing the one-way hash of the binary when the fuzzy hash of the binary differs less than a threshold amount from the fuzzy hash of the second binary.

In Example 13, the subject matter of Example 12 optionally includes wherein the binary file comprises an executable file.

In Example 14, the subject matter of any one or more of Examples 12-13 optionally include wherein calculating the fuzzy hash of the binary comprises using a context triggered piecewise hash methodology.

In Example 15, the subject matter of Example 14 optionally includes wherein obtaining the fuzzy hash of the second binary comprises using the context triggered piecewise hash methodology.

In Example 16, the subject matter of Example 15 optionally includes wherein the second binary is a previous version of the binary file.

In Example 17, the subject matter of any one or more of Examples 12-16 optionally include wherein signing the one-way hash of the binary comprises using a private key infrastructure digital signature to sign the one-way hash.

In Example 18, the subject matter of any one or more of Examples 12-17 optionally include wherein the threshold amount is user configurable.

In Example 19, the subject matter of any one or more of Examples 12-18 optionally include wherein the threshold amount is based on a running average.

In Example 20, the subject matter of any one or more of Examples 12-19 optionally include initiating a recovery process when the fuzzy hash of the binary differs more than the threshold amount from the fuzzy hash of the second binary.

In Example 21, the subject matter of Example 20 optionally includes wherein the recovery process comprises presenting an alert to a user of the build system.

In Example 22, the subject matter of any one or more of Examples 20-21 optionally include wherein the recovery process comprises aborting a signing process to avoid signing the binary file.

Example 23 is at least one machine-readable medium including instructions, which when executed by a machine, cause the machine to perform operations of any of the methods of Examples 12-22.

Example 24 is an apparatus comprising means for performing any of the methods of Examples 12-22.

Example 25 is an apparatus for using fuzzy hashes for code signing, the apparatus comprising: means for accessing, in a build system, a binary file; means for generating, in the build system, a one-way hash of the binary; means for calculating, in the build system, a fuzzy hash of the binary; means for obtaining, in the build system, a fuzzy hash of a second binary; and means for conditionally signing the one-way hash of the binary when the fuzzy hash of the binary differs less than a threshold amount from the fuzzy hash of the second binary.

In Example 26, the subject matter of Example 25 optionally includes wherein the binary file comprises an executable file.

In Example 27, the subject matter of any one or more of Examples 25-26 optionally include wherein the means for calculating the fuzzy hash of the binary comprises means for using a context triggered piecewise hash methodology.

In Example 28, the subject matter of Example 27 optionally includes wherein the means for obtaining the fuzzy hash of the second binary comprises means for using the context triggered piecewise hash methodology.

In Example 29, the subject matter of Example 28 optionally includes wherein the second binary is a previous version of the binary file.

In Example 30, the subject matter of any one or more of Examples 25-29 optionally include wherein the means for signing the one-way hash of the binary comprises means for using a private key infrastructure digital signature to sign the one-way hash.

In Example 31, the subject matter of any one or more of Examples 25-30 optionally include wherein the threshold amount is user configurable.

In Example 32, the subject matter of any one or more of Examples 25-31 optionally include wherein the threshold amount is based on a running average.

In Example 33, the subject matter of any one or more of Examples 25-32 optionally include means for initiating a recovery process when the fuzzy hash of the binary differs more than the threshold amount from the fuzzy hash of the second binary.

In Example 34, the subject matter of Example 33 optionally includes wherein the recovery process comprises presenting an alert to a user of the build system.

In Example 35, the subject matter of any one or more of Examples 33-34 optionally include wherein the recovery process comprises aborting a signing process to avoid signing the binary file.

Example 36 is at least one machine-readable medium including instructions for using fuzzy hashes for code signing, which when executed by a machine, cause the machine to: access, in a build system, a binary file; generate, in the build system, a one-way hash of the binary, calculate, in the build system, a fuzzy hash of the binary; obtain, in the build system, a fuzzy hash of a second binary; and conditionally sign the one-way hash of the binary when the fuzzy hash of the binary differs less than a threshold amount from the fuzzy hash of the second binary.

In Example 37, the subject matter of Example 36 optionally includes wherein the binary file comprises an executable file.

In Example 38, the subject matter of any one or more of Examples 36-37 optionally include wherein the instructions to calculate the fuzzy hash of the binary comprises instructions to use a context triggered piecewise hash methodology.

In Example 39, the subject matter of Example 38 optionally includes wherein the instructions to obtain the fuzzy hash of the second binary comprises instructions to use the context triggered piecewise hash methodology.

In Example 40, the subject matter of Example 39 optionally includes wherein the second binary is a previous version of the binary file.

In Example 41, the subject matter of any one or more of Examples 36-40 optionally include wherein the instructions to sign the one-way hash of the binary comprises instructions to use a private key infrastructure digital signature to sign the one-way hash.

In Example 42, the subject matter of any one or more of Examples 36-41 optionally include wherein the threshold amount is user configurable.

In Example 43, the subject matter of any one or more of Examples 36-42 optionally include wherein the threshold amount is based on a running average.

In Example 44, the subject matter of any one or more of Examples 36-43 optionally include instructions to initiate a recovery process when the fuzzy hash of the binary differs more than the threshold amount from the fuzzy hash of the second binary.

In Example 45, the subject matter of Example 44 optionally includes wherein the recovery process comprises presenting an alert to a user of the build system.

In Example 46, the subject matter of any one or more of Examples 44-45 optionally include wherein the recovery process comprises aborting a signing process to avoid signing the binary file.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "herein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A build system for using fuzzy hashes for code signing, the system comprising:
   a processor subsystem; and
   memory including instructions, which when executed on the processor subsystem, cause the processor subsystem to implement:
   a file system to access a binary file; and
   a signing engine to:
      generate a one-way hash of the binary file;
      calculate a fuzzy hash of the binary file;
      obtain a fuzzy hash of a second binary file; and
      conditionally sign the one-way hash of the binary when the fuzzy hash of the binary file differs less than a threshold amount from the fuzzy hash of the second binary file, wherein to calculate the fuzzy hash of the binary file, the signing engine is to use a context triggered piecewise hash methodology, and wherein to obtain the fuzzy hash of the second binary file, the signing engine is to use the context triggered piecewise hash methodology.

2. The system of claim 1, wherein the binary file comprises an executable file.

3. The system of claim 1, wherein the second binary file is a previous version of the binary file.

4. The system of claim 1, wherein to sign the one-way hash of the binary file, the signing engine is to use a private key infrastructure digital signature to sign the one-way hash.

5. The system of claim 1, wherein the threshold amount is user configurable.

6. The system of claim 1, wherein the threshold amount is based on a running average.

7. The system of claim 1, wherein the signing engine is to initiate a recovery process when the fuzzy hash of the binary file differs more than the threshold amount from the fuzzy hash of the second binary file.

8. The system of claim 7, wherein the recovery process comprises presenting an alert to a user of the build system.

9. The system of claim 7, wherein the recovery process comprises aborting a signing process to avoid signing the binary file.

10. A method of using fuzzy hashes for code signing, the method comprising:
    accessing, in a build system, a binary file;
    generating, in the build system, a one-way hash of the binary file;
    calculating, in the build system, a fuzzy hash of the binary file;
    obtaining, in the build system, a fuzzy hash of a second binary file; and
    conditionally signing the one-way hash of the binary file when the fuzzy hash of the binary file differs less than a threshold amount from the fuzzy hash of the second binary file, wherein calculating the fuzzy hash of the binary file comprises using a context triggered piecewise hash methodology, and wherein obtaining the fuzzy hash of the second binary file comprises using the context triggered piecewise hash methodology.

11. The method of claim 10, wherein the binary file comprises an executable file.

12. The method of claim 10, wherein the second binary file is a previous version of the binary file.

13. The method of claim 10, wherein signing the one-way hash of the binary file comprises using a private key infrastructure digital signature to sign the one-way hash.

14. The method of claim 10, wherein the threshold amount is user configurable.

15. The method of claim 10, wherein the threshold amount is based on a running average.

16. The method of claim 10, further comprising initiating a recovery process when the fuzzy hash of the binary file differs more than the threshold amount from the fuzzy hash of the second binary file.

17. The method of claim 16, wherein the recovery process comprises presenting an alert to a user of the build system.

18. The method of claim 16, wherein the recovery process comprises aborting a signing process to avoid signing the binary file.

19. At least one non-transitory machine-readable medium including instructions for using fuzzy hashes for code signing, which when executed by a machine, cause the machine to:
    access, in a build system, a binary file;
    generate, in the build system, a one-way hash of the binary file;
    calculate, in the build system, a fuzzy hash of the binary file;
    obtain, in the build system, a fuzzy hash of a second binary file; and
    conditionally sign the one-way hash of the binary file when the fuzzy hash of the binary file differs less than a threshold amount from the fuzzy hash of the second binary file wherein the instructions to calculate the fuzzy hash of the binary file comprises instructions to use a context triggered piecewise hash methodology, and wherein the instructions to obtain the fuzzy hash of the second binary file comprises using the context triggered piecewise hash methodology.

\* \* \* \* \*

UNITED STATES PATENT AND TRADEMARK OFFICE
CERTIFICATE OF CORRECTION

PATENT NO. : 10,177,919 B2
APPLICATION NO. : 15/277663
DATED : January 8, 2019
INVENTOR(S) : Branco

Page 1 of 1

It is certified that error appears in the above-identified patent and that said Letters Patent is hereby corrected as shown below:

In the Claims

In Column 12, Line 32, in Claim 19, after "file", insert --,--

Signed and Sealed this
Twenty-first Day of April, 2020

Andrei Iancu
*Director of the United States Patent and Trademark Office*